(12) United States Patent
Magnetto

(10) Patent No.: US 8,646,262 B2
(45) Date of Patent: Feb. 11, 2014

(54) UNIT FOR RECOVERING AND CONVERTING THE THERMAL ENERGY OF THE EXHAUST GASES OF AN INTERNAL COMBUSTION ENGINE OF A VEHICLE

(75) Inventor: Daniela Magnetto, Orbassano (IT)

(73) Assignee: C.R.F. Società Consortile per Azioni, Orbassano (Turin) (IT)

( * ) Notice: Subject to any disclaimer, the term of this patent is extended or adjusted under 35 U.S.C. 154(b) by 152 days.

(21) Appl. No.: 13/321,334

(22) PCT Filed: Nov. 26, 2010

(86) PCT No.: PCT/IB2010/055445
§ 371 (c)(1),
(2), (4) Date: Nov. 18, 2011

(87) PCT Pub. No.: WO2011/132035
PCT Pub. Date: Oct. 27, 2011

(65) Prior Publication Data
US 2012/0102934 A1    May 3, 2012

(30) Foreign Application Priority Data
Apr. 22, 2010   (EP) ..................................... 10425133

(51) Int. Cl.
*F01N 3/02*       (2006.01)
(52) U.S. Cl.
USPC ................... 60/320; 60/278; 60/287; 60/292; 60/298; 60/324; 165/51; 165/52
(58) Field of Classification Search
USPC ........... 60/274, 278, 287, 288, 292, 298, 300, 60/320, 324; 165/51, 52
See application file for complete search history.

(56) References Cited

U.S. PATENT DOCUMENTS 3,282,046 A * 11/1966 Walker et al. .................... 60/288
6,155,042 A * 12/2000 Perset et al. ..................... 60/278
(Continued)

FOREIGN PATENT DOCUMENTS

EP    0 913 561      5/1999
EP    1 475 532      11/2004
(Continued)

OTHER PUBLICATIONS

International Search Report for PCT/IB2010/055445 mailed Sep. 9, 2011.

(Continued)

*Primary Examiner* — Binh Q Tran
(74) *Attorney, Agent, or Firm* — Nixon & Vanderhye P.C.

(57) ABSTRACT

A unit (1, 1') for recovering and converting thermal energy from the exhaust gases of an internal combustion engine (14) of a vehicle comprises a heat exchanger (2, 2') to be traversed by exhaust gases flowing along a by-pass path (5,5') branching out from an exhaust gas main line (4) of said internal combustion engine (14) and valve means (12) for controlling the flow of the exhaust gases through said path, said valve means (12) being driven by an actuator device (12A). The by-pass path (5, 5') is a U-shaped path defined entirely within the heat exchanger (2, 2'), starting from an inlet section (6, 6') and ending at an outlet section of the heat exchanger, the inlet and outlet sections (7,7') being located on a same side of the heat exchanger (2) and both opening on an interface conduit portion (3) interposed in said exhaust gas main line (4). The heat exchanger (2, 2') is arranged so that said U-shaped path is oriented transversely to the direction of the exhaust gas main line (4), in such a manner that the exhaust gases traversing the heat exchanger flow firstly in the transverse direction away from the exhaust gas main line (4) and then back in the transverse direction towards the exhaust gas main line (4), The valve means (12) are arranged within said interface conduit portion (3), between merging points of the inlet and outlet portions (6,7) of the heat exchanger (2,2').

13 Claims, 14 Drawing Sheets

(56) References Cited

U.S. PATENT DOCUMENTS

Figure 1:
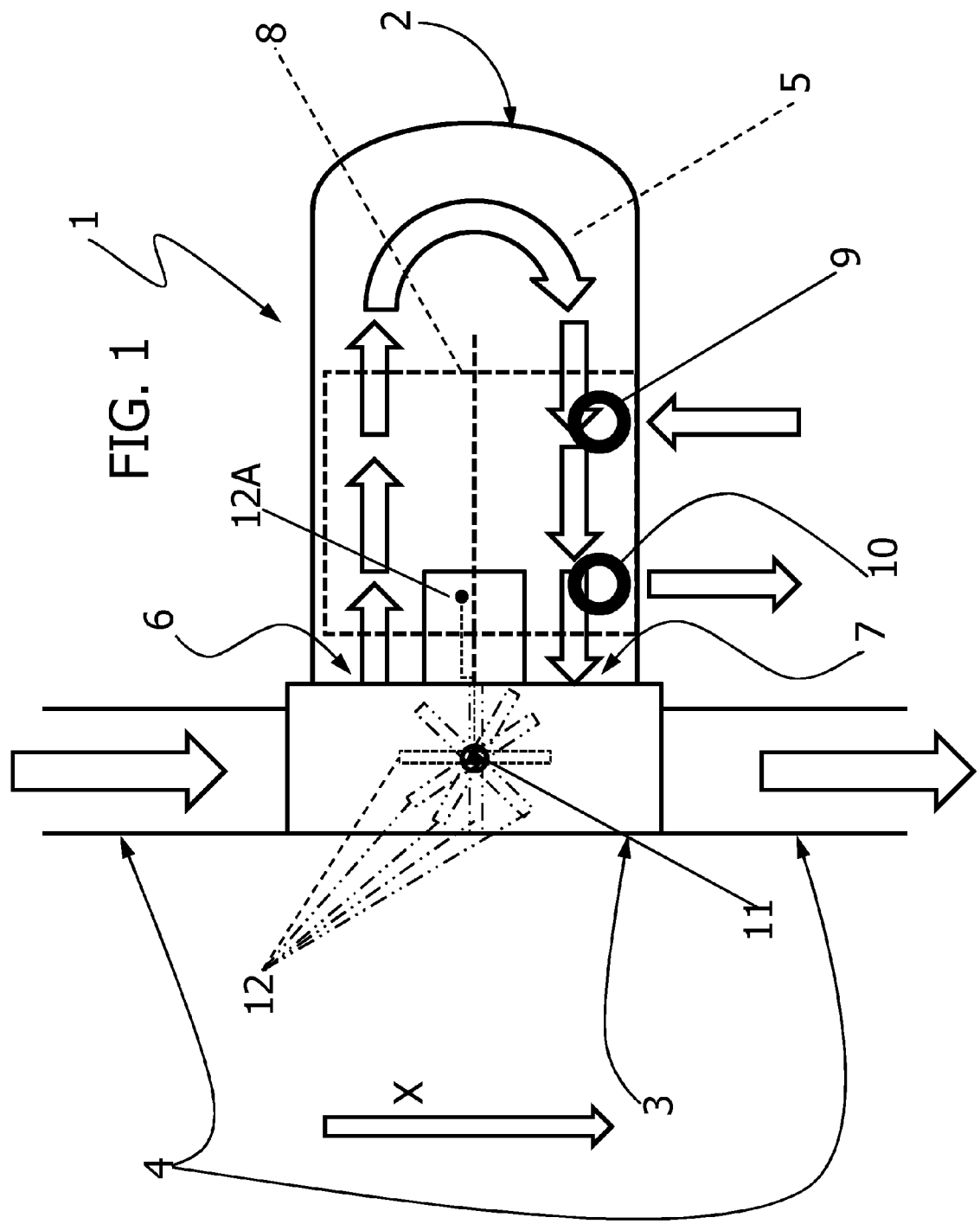

| | | | |
|---|---|---|---|
| 6,702,190 B1 * | 3/2004 | Nohl et al. | 237/12.3 C |
| 7,077,776 B2 * | 7/2006 | Sorab et al. | 475/161 |
| 8,011,175 B2 * | 9/2011 | Husges et al. | 60/278 |
| 8,146,344 B2 * | 4/2012 | Harada et al. | 60/277 |
| 8,261,814 B2 * | 9/2012 | Lempa et al. | 165/103 |
| 8,327,634 B2 * | 12/2012 | Orihashi et al. | 60/320 |
| 2008/0115487 A1 | 5/2008 | Harada et al. | |

FOREIGN PATENT DOCUMENTS

| | | |
|---|---|---|
| EP | 1 739 298 | 1/2007 |
| FR | 2 859 239 | 3/2005 |

OTHER PUBLICATIONS

Written Opinion of the International Searching Authority mailed Sep. 9, 2011.

* cited by examiner

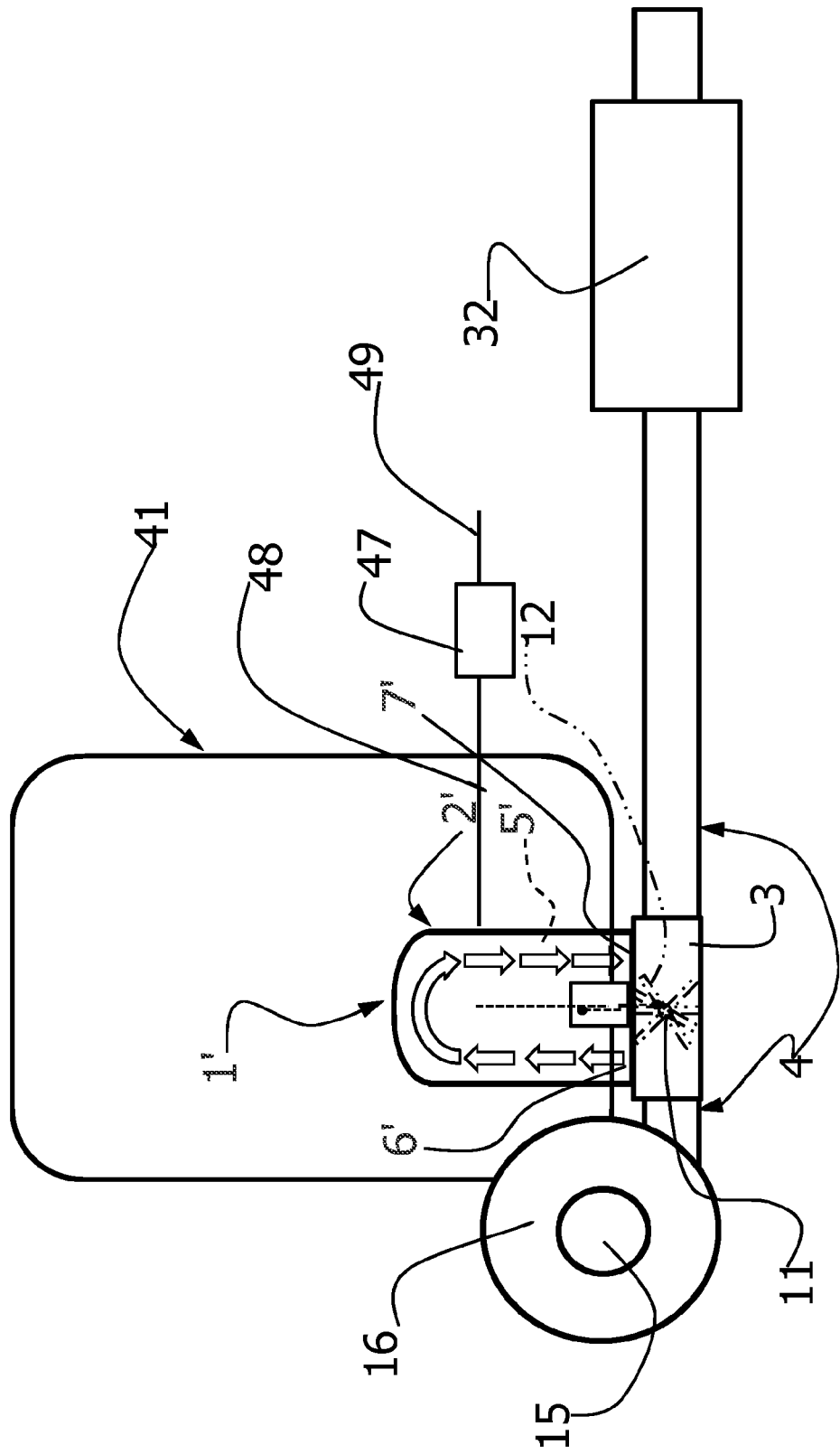

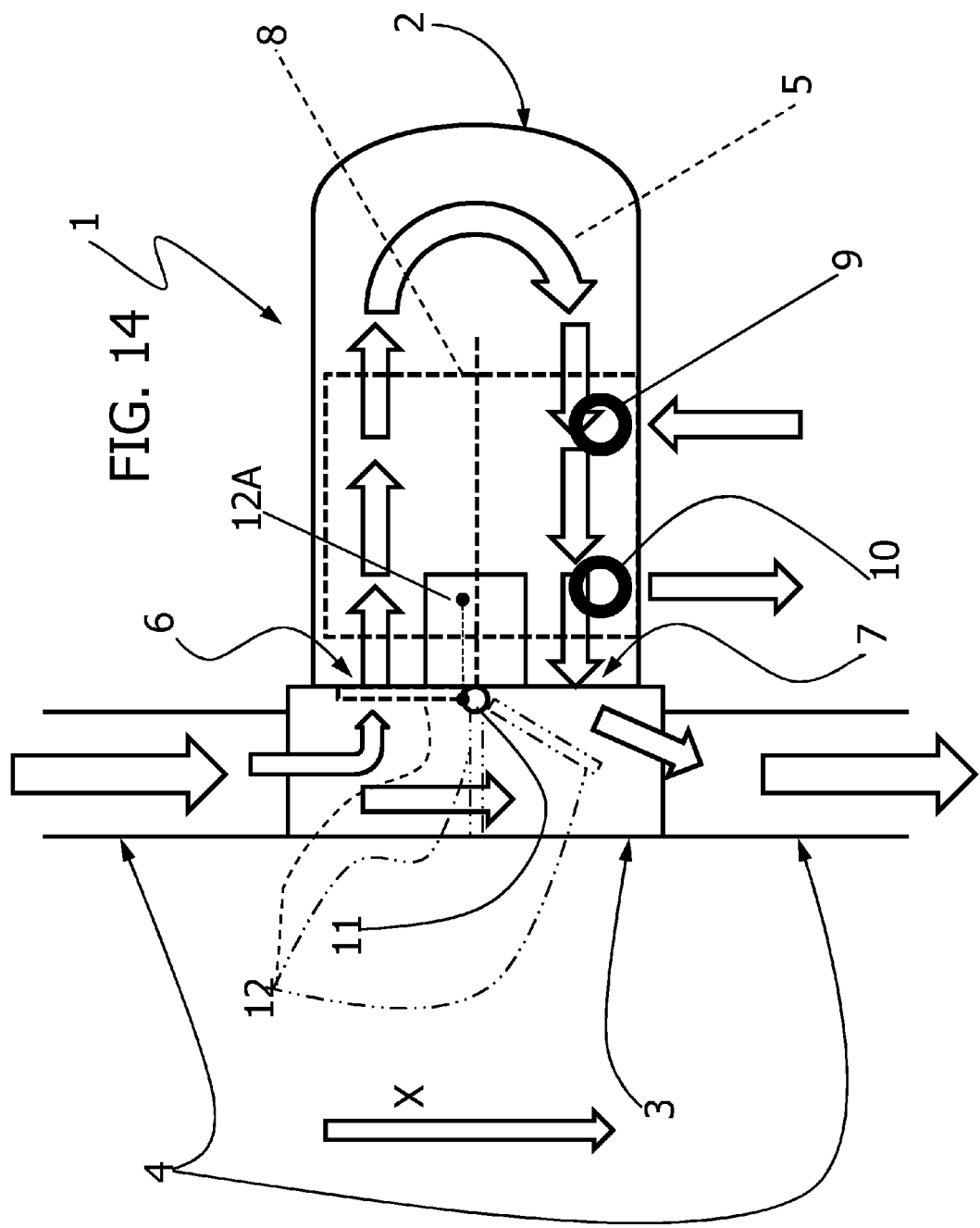

UNIT FOR RECOVERING AND CONVERTING THE THERMAL ENERGY OF THE EXHAUST GASES OF AN INTERNAL COMBUSTION ENGINE OF A VEHICLE

This application is the U.S. national phase of International Application No. PCT/IB2010/055445 filed 26 Nov. 2010 which designated the U.S. and claims priority to EP 10425133.5 filed 22 Apr. 2010, the entire contents of each of which are hereby incorporated by reference.

FIELD OF THE INVENTION

The present invention refers to a unit for recovering and converting thermal energy from the exhaust gases of an internal combustion engine of a vehicle, of the type comprising:
- a heat exchanger to be traversed by exhaust gases flowing along a by-pass path branching out from an exhaust gas main line of said internal combustion engine, and
- valve means for controlling the flow of the exhaust gases through said by-pass path, said valve means being driven by an actuator device.

Units of this type are disclosed in EP 0 913 561 A2, US 2008/115487 A1 and EP 1 475 532 A2.

GENERAL TECHNICAL PROBLEM AND DESCRIPTION OF THE PRIOR ART

Over the last years, the automotive industry has been more and more oriented, in the design of engines, onboard systems and the vehicle itself, towards the reduction of fuel consumptions, pollutant emissions, recyclability of materials and, last but not least, the recovery and the conversion of the energy that would be normally dissipated.

The present invention lies within the latter context, in particular the recovery of thermal energy of the exhaust gases of an internal combustion engine of a vehicle.

The exhaust gases that exit from an internal combustion engine have, after being treated by a catalyst or in a more complex unit for the treatment of pollutant emissions, an amount of thermal energy still useable for producing a useful effect. Such energy is usually dissipated along the exhaust line downstream of the catalyst and in the atmosphere when discharging the gases.

However, the energy of the exhaust gases may be exploited for heating a fluid inside a heat exchanger. Solutions of this type, which envisage the insertion of a heat exchanger arranged in series on the exhaust line downstream of the catalyst, are already known and employ, for example, a layout of the three-way type or of the concentric pipes type which transfer part of the thermal energy contained in the exhaust gases to the cooling water of the engine, thus contributing to reducing the times required to attain the steady thermal condition of the engine itself. This aspect is particularly important due to the fact that, during a cold start, an engine does not operate under optimal lubrication conditions due to the high viscosity of the oil. This, lastly, is susceptible of increasing frictions between the mobile parts of the engine and hence increase fuel consumption.

The systems of known type have a series of drawbacks. First, the layout of the system is typically quite cumbersome with respect to the space generally available inside an engine compartment of a vehicle, hence setting considerable restrictions related to the arrangement of the components. The currently available solution is that of arranging the system beneath the floor of the vehicle (the so-called "underfloor") beyond the flame damper wall of the vehicle, hence at a position quite distant from the catalyst.

However, advantages of such systems in terms of energy are quite few given that due to this arrangement, the exhaust gases that reach the exchanger have a temperature that is insufficient to guarantee a transfer of energy to the cooling water of the engine such to have a considerable impact on the fuel consumptions of the engine.

In addition, the abovementioned overall dimensions are generally not compatible with the installation of such systems on small vehicles, especially if provided with a central muffler, such as category A or B vehicles, which represent the majority of vehicles circulating in the big cities and urban centres.

Additionally, such vehicles are generally designed in such a manner to have low running costs and low fuel consumption to attract a wide range of customers: using this kind of system, alongside the undeniable advantages it may provide, may make the product more attractive for the customers. Thus, there clearly arises the need to find an alternative solution capable of allowing to overcome the problems listed above.

OBJECT OF THE INVENTION

The object of the present invention is that of overcoming the problems described above. In particular, the object of the present invention is that of providing a unit for recovering the thermal energy contained in the exhaust gases such unit not revealing the drawbacks related to the overall dimensions described previously and which may be installed with least impact on the production costs of the vehicle.

SUMMARY OF THE INVENTION

The object of the present invention is achieved by a unit having all the features indicated at the beginning of this description and further characterised in that:
- said by-pass path is a U-shaped path defined entirely by said heat exchanger, starting from an inlet section of said heat exchanger and ending at an outlet section of said heat exchanger, said inlet and outlet sections being located on a same side of the heat exchanger and both opening on an interface conduit portion interposed along said exhaust gas main line,
- said heat exchanger is arranged so that said U-shaped path is oriented transversely to the direction of the exhaust gas main line, in such a manner that the exhaust gases traversing the heat exchanger flow firstly in the transverse direction away from the exhaust gas main line and then back in the transverse direction towards the exhaust gas main line,
- said valve means being arranged within said interface conduit portion, at a position axially intermediate between merging points of said inlet and outlet portions of the heat exchanger.

As a result of this specific structure and arrangement, the unit according to the invention is extremely compact, and in particular has a very reduced dimension in the longitudinal direction of the exhaust gas main line. This enables the unit of the invention to be placed in a position very close to the catalytic converter of the vehicle, with the result of a higher thermal power recovery as compared to the heat recovery systems of the prior art, which cannot be installed in that position because of their larger dimension in the longitudinal direction of the exhaust gas main line.

DESCRIPTION OF THE ATTACHED DRAWINGS

Figure 2:
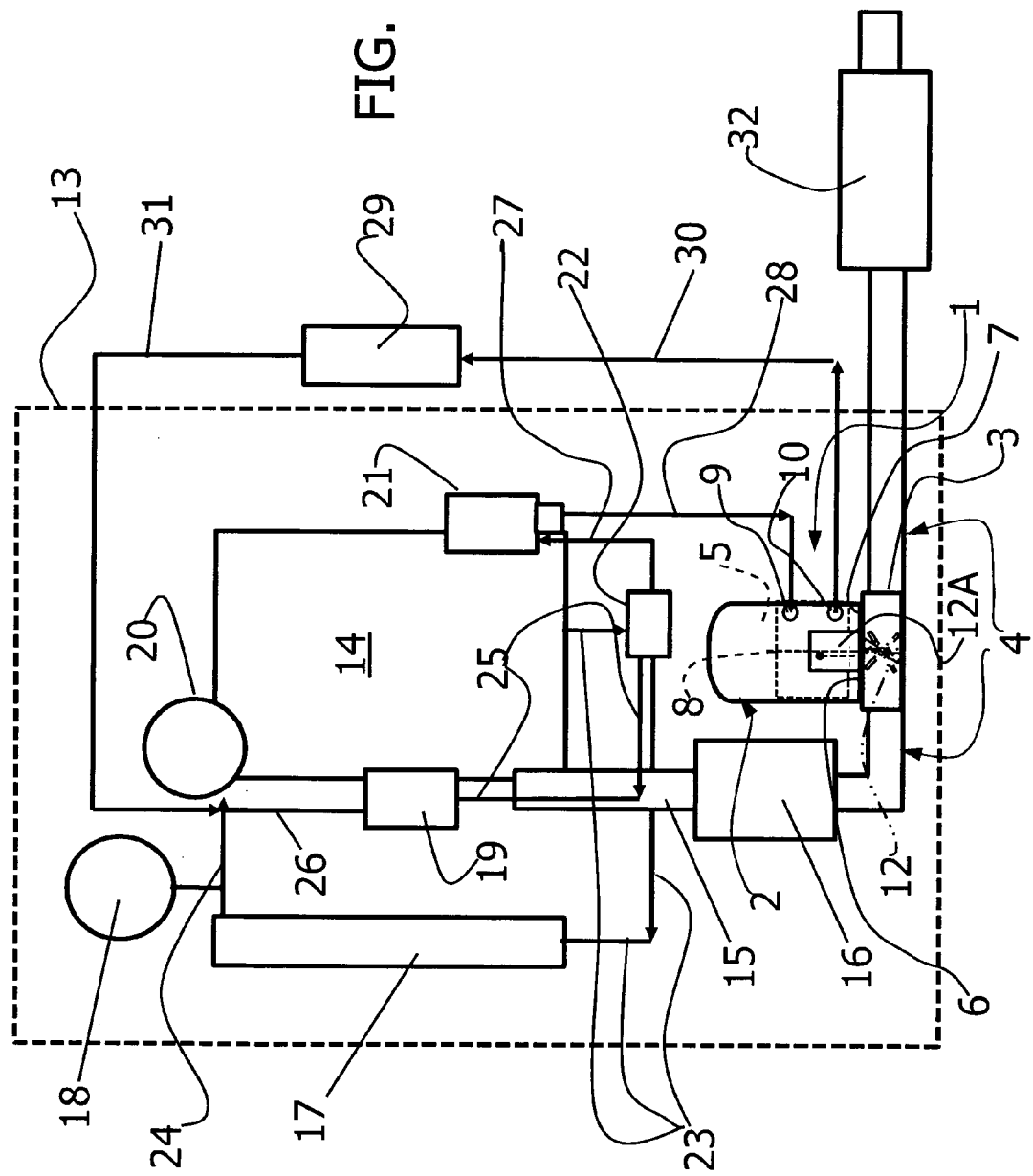
Figure 3:
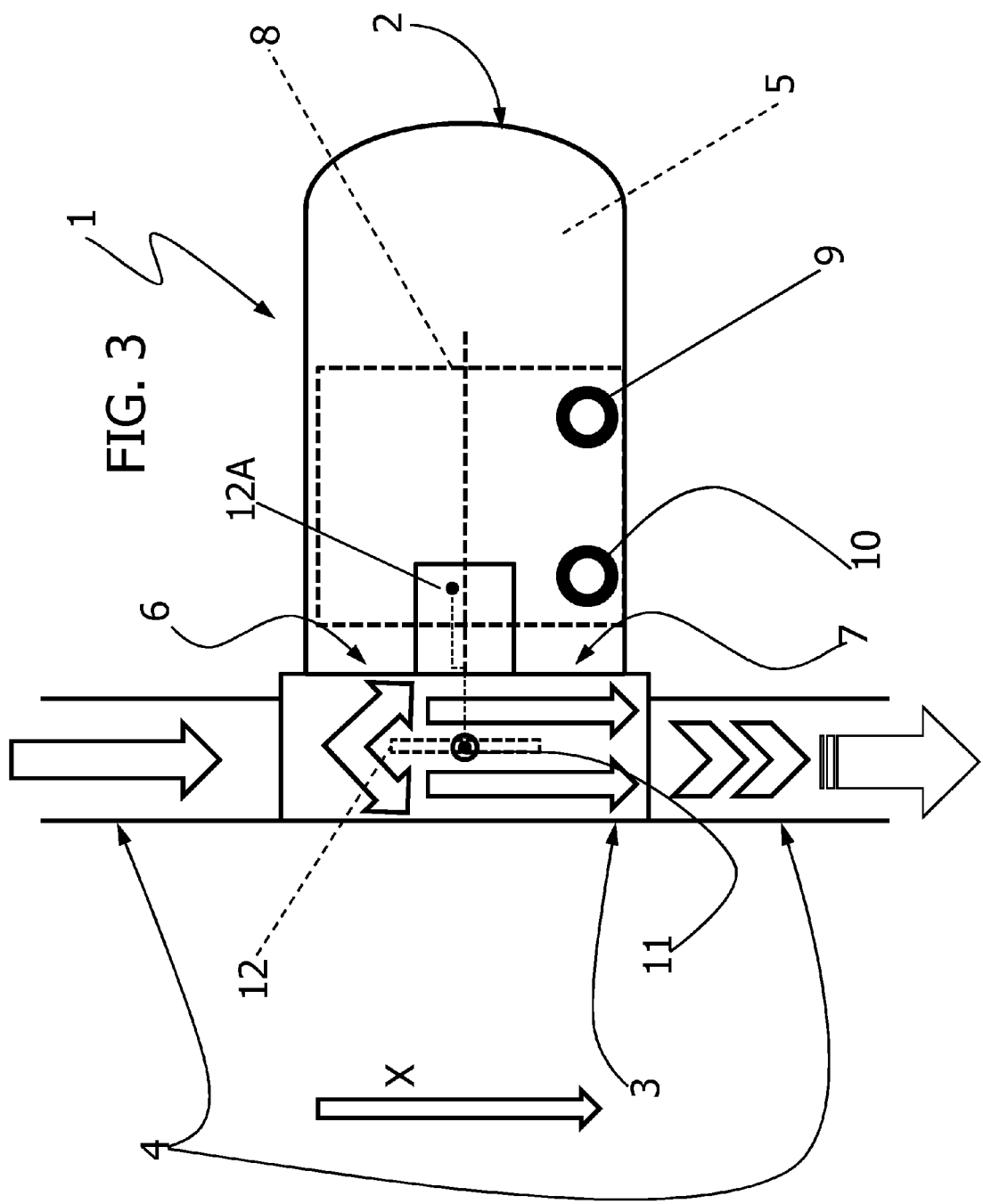
Figure 4:
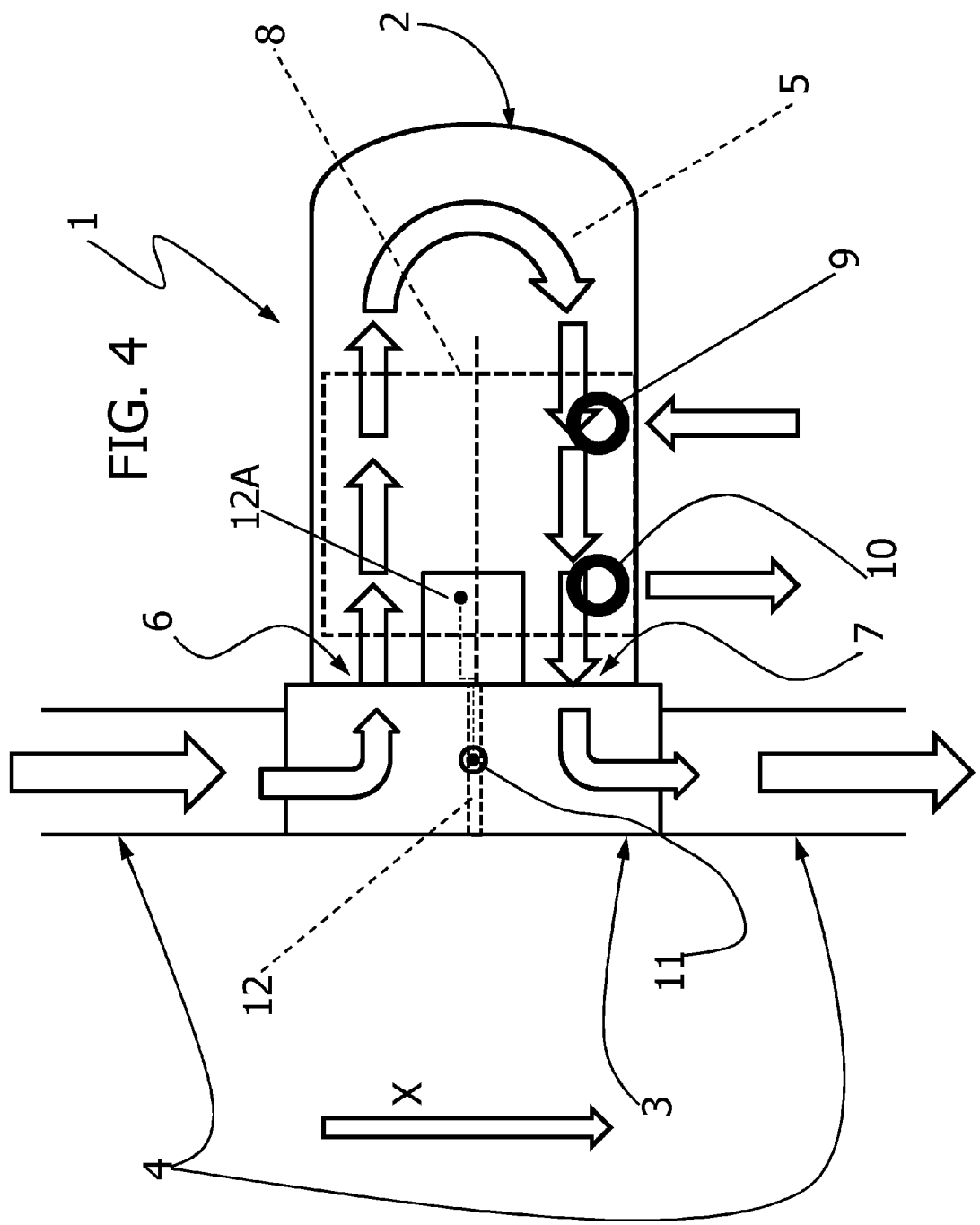
Figure 5:
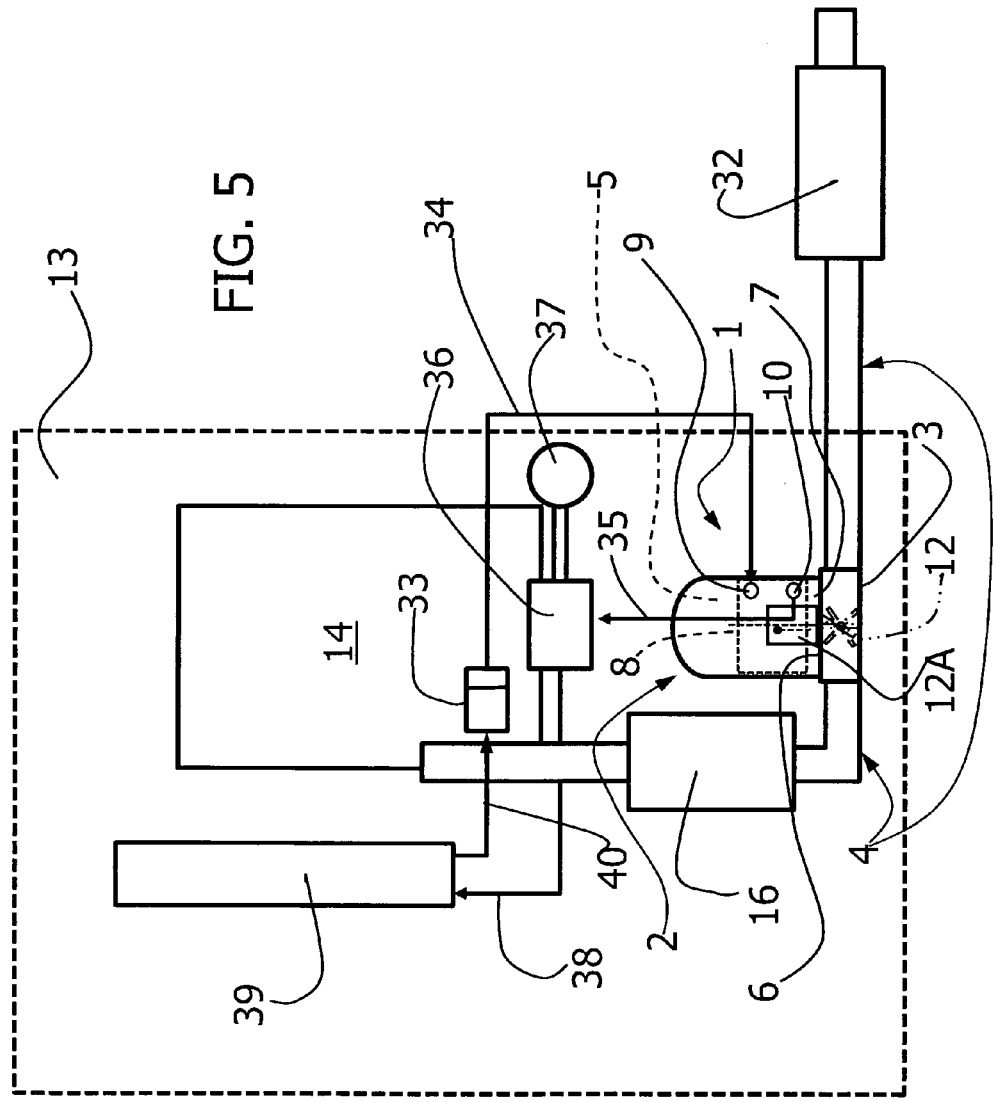
Figure 6:
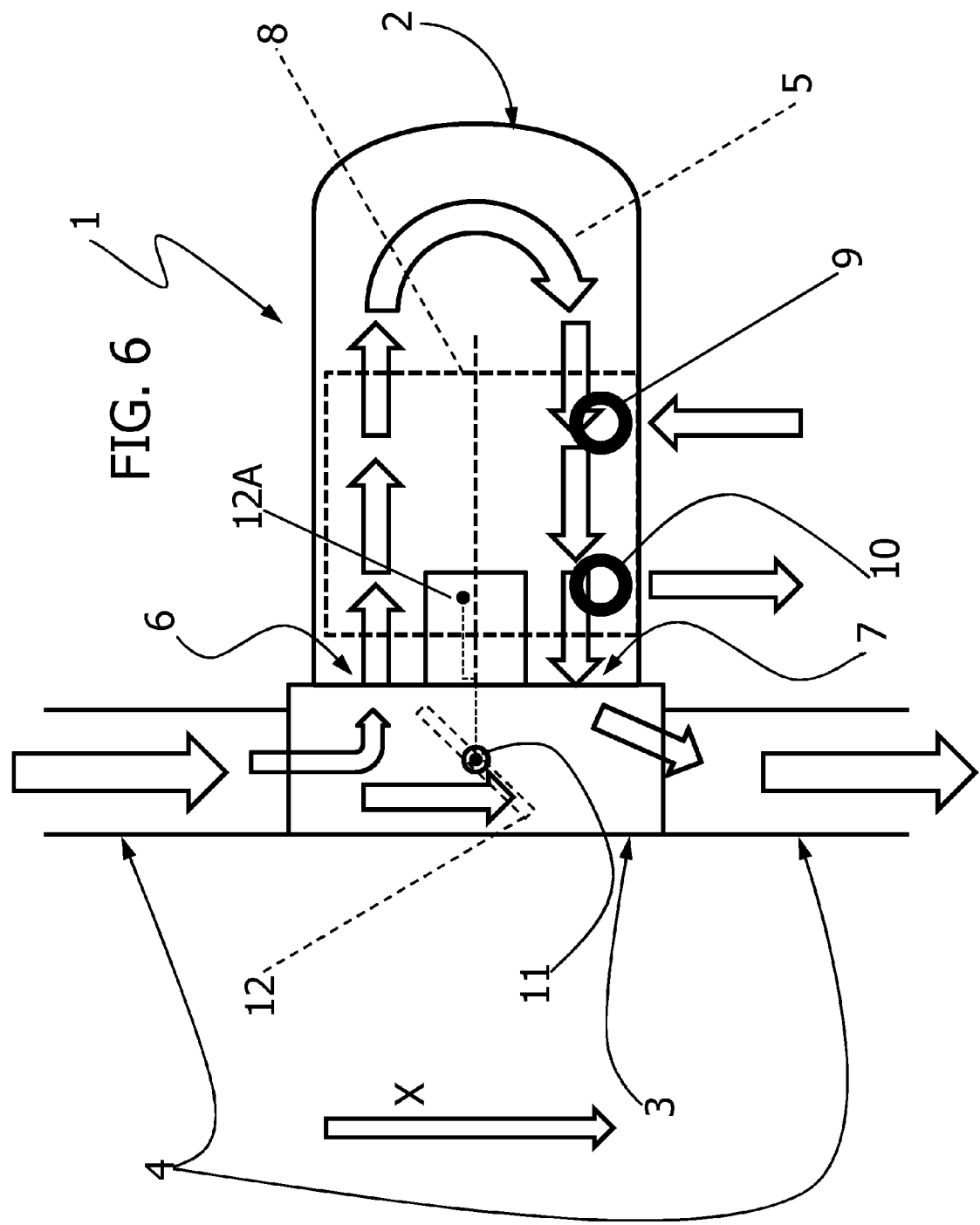
Figure 7:
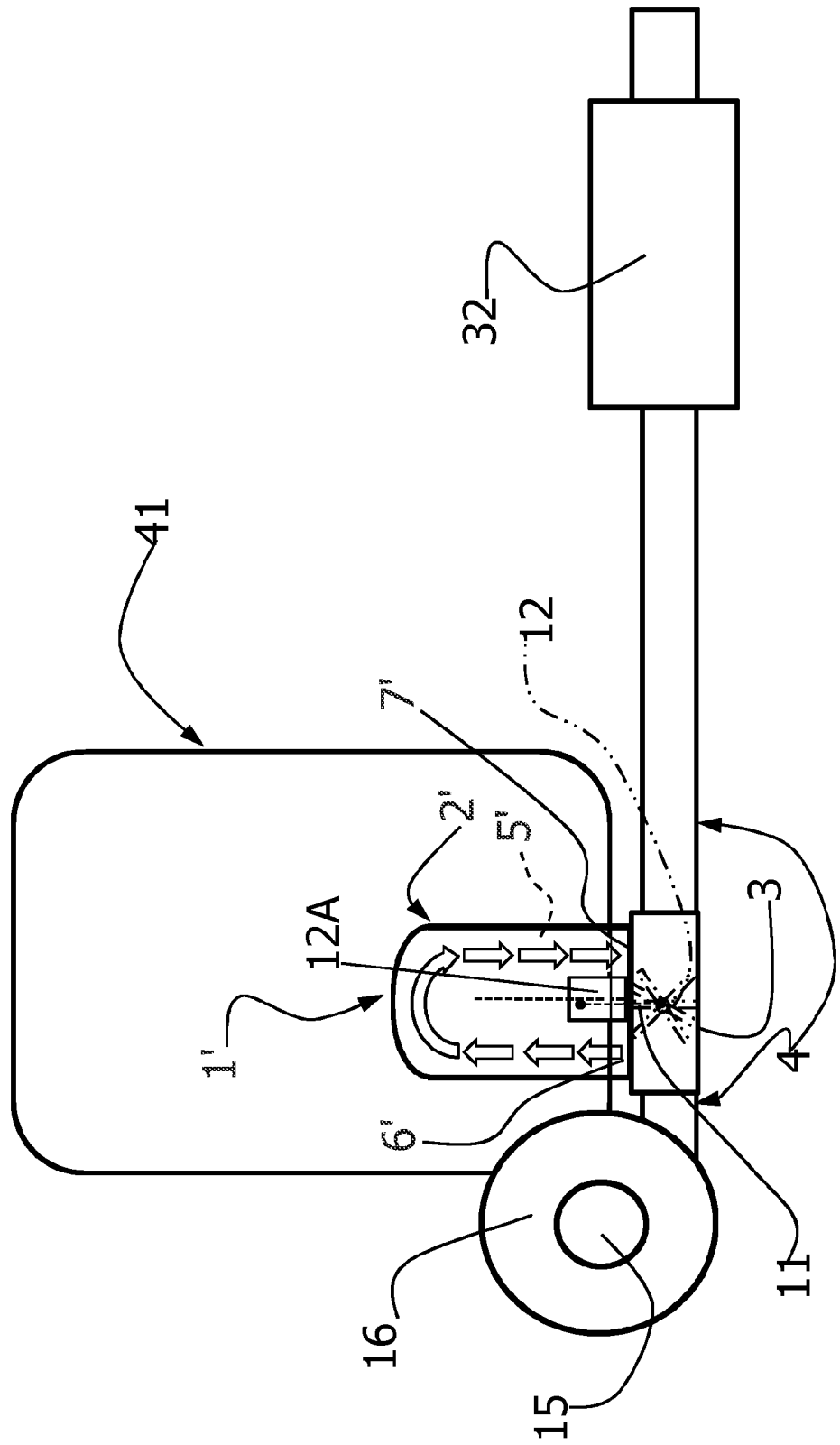

The invention will now be described with reference to the attached drawings, purely provided by way of non limiting example, wherein:

FIG. 1 is a schematic view of a unit for recovering the thermal energy of the exhaust gases according to the present invention, FIG. 2 schematically illustrates a first application of the unit of FIG. 1, FIG. 3 illustrates the unit of FIG. 1 in a first operating condition, FIG. 4 illustrates the unit of FIG. 1 in a second operating condition, FIG. 5 illustrates a second application of the unit of FIG. 1, FIG. 6 illustrates the unit of FIG. 1 in a third operating condition, FIG. 7 illustrates a third application of the unit of FIG. 1, FIGS. 8 to 13 illustrate further applications of the units of FIGS. 1 and 7, and FIG. 14 illustrates a variant of the unit of FIG. 1.

DETAILED DESCRIPTION OF THE INVENTION

A unit for recovering and converting the thermal energy contained in the exhaust gases of an internal combustion engine according to the present invention is indicated with 1 in FIG. 1.

The unit 1 comprises a heat exchanger 2 connected, by means of an interface conduit portion 3, along an exhaust gas main line 4. The interface 3 is in form of an interface conduit portion interposed in the exhaust gas main line 4.

The exchanger 2 is of the so-called U-type, defining therein a substantially U-shaped path 5 for the exhaust gases, starting from an inlet section 6 of the heat exchanger and ending at an outlet section 7 of the heat exchanger. The inlet and outlet sections 6, 7 of the heat exchanger are located on the same side of the heat exchanger and both open on said interface conduit portion 3. As a result of this arrangement, the path 5 within the heat exchanger defines entirely in itself the by-pass path branching out from the exhaust gas main line 4.

The heat exchanger 2 is arranged so that said U-shaped path is oriented transversely to the direction of the exhaust gas main line 4, in such a manner that the exhaust gases traversing the heat exchanger flow firstly in the transverse direction away from the exhaust gas main line 4 and then back in the transverse direction towards the exhaust gas main line 4.

The above mentioned U-shaped path 5 within the heat exchanger 2 is defined by the elements constituting the structure of the heat exchanger, according to a technique know per se in the field of U-type heat exchangers. Typically, this path is constituted by a number of parallel passages defined between a plurality of stacked plates, but any alternative arrangement of pipes or tubes or the like, as known to those skilled in the art, may be adopted. The tubular elements may have any type of cross-section, e.g. circular, or quadrangular or flattened.

These details of construction of the heat exchanger are not disclosed herein, since they can be made in any known way and also because the elimination of these details from the drawings render the latter simpler and easier to understand.

Inside the interface 3, which is essentially configured as a tubular portion interposed in the exhaust gas main line 4, there is arranged a valve 12 for controlling the flow of exhaust gases through the heat exchanger. The valve 12 is located at a position axially intermediate between the merging points of the inlet and outlet portions 6, 7 of the heat exchanger 2 with the conduit portion 3. In the illustrated example the valve 12 is in form of a flap 12, articulated to the portion 3 around an axis 11. An actuator device 12A is arranged for driving the rotation of the flap 12.

The heat exchanger 2 further comprises a heat exchange unit 8 comprising an inlet orifice 9 and an outlet orifice 10. In the present description, by the term "heat exchange unit" it is meant to generally indicate any type of unit for a fluid which must recover heat from the exhaust gases flowing through the path 5.

Referring to FIG. 2, the unit 1 is installed in an engine unit 13 accommodated in the engine bonnet of a motor vehicle. The engine unit 13 comprises an internal combustion engine 14, an exhaust manifold 15, a unit for treating the exhaust gases 16, a radiator 17 having a nourice 18, an oil cooler 19, a water pump 20 and, in the embodiment illustrated herein, a heat exchanger for EGR 21, and a thermostatic valve 22. The heat exchanger for EGR 21 may possibly not be present, especially in cases in which the engine 14 is of the spark ignition type.

The exhaust manifold 15 is fixed onto the engine 14 and it is fluid dynamically connected therewith for the collection of the exhaust gases coming therefrom. The exhaust manifold 15 is also connected to and fluid dynamically communicating with the unit for treating the exhaust gases 16, in turn connected to and fluid dynamically communicating with the exhaust gas main line 4.

The radiator 17 is fluid dynamically connected to the engine 14 by means of a conduit 23, schematically represented herein and installed on which is the thermostatic valve 22. The radiator 17 is also fluid dynamically connected to the nourice 18 and to the water pump 20 by means of a conduit 24. The water pump is in turn connected mechanically and fluid dynamically (in particular to a cooling circuit) to the engine 14.

The oil cooler 19 is fluid dynamically connected to the engine 14 by means of a conduit 25 and it is connected by means of a conduit 26 to an oil pump (not illustrated) in turn mechanically and fluid dynamically connected to the engine 14.

The heat exchanger for EGR 21 is fluid dynamically connected to the cooling circuit of the engine 14 by means of a conduit 27 and it is fluid dynamically connected to the inlet orifice 9 of the exchanger 2 by means of a conduit 28.

A cabin heater 29 is fluid dynamically connected to the orifice 10 of the exchanger 2 by means of a conduit 30 and it is fluid dynamically connected to the water pump 20 and cooling circuit of the engine 14 by means of a conduit 31.

The exchanger 2 is, as described, connected to the exhaust gas main line 4 by means of the interface 3. A muffler 32 is positioned at the end of the exhaust gas main line 4 before the outlet thereof to the atmosphere.

The unit 1 operates as follows.

Referring to FIG. 2, part of the cooling water of the engine 14 flows, at its maximum temperature, from the engine 14 into the radiator 17 through the conduit 23 and from the engine 14 towards the heat exchanger for EGR 21 through the conduit 27. Here, the cooling water receives a heat flow from the recirculated exhaust gases (EGR) which flow into the heat exchanger 21 and flows out from the exchanger 21 itself towards the inlet orifice 9 by means of the conduit 28.

From here, the water passes through the heat exchange unit 8 and exits therefrom through the outlet orifice 10 moving towards the cabin heater 29 by means of the conduit 30. The water thus leaves the cabin heater 29 through the conduit 31 which is connected to a suction opening of the pump 20. The remaining amount of the cooling water of the engine 14 usually passes through the conduit 23 and flows into the radiator 17, from which it flows out, after being cooled by the air flow which impacts the radiator 17 itself, through the conduit 24 which is also connected to the suction opening on the pump 20.

In case the oil cooler 19 is of the water/oil type, as illustrated in FIG. 2, part of the cooling water also flows into the radiator 19 through the conduit 25 and returns to the inlet of the pump 20 through the conduit 26.

The actuator device 12A monitors—by means of per se known sensors—the temperature of the cooling water at the exit from the engine 14 to command the movement of the flap 12 of the unit 1.

In particular, referring to FIGS. 3, 4 the actuator device 12A is capable of modulating the position of the flap 12 between a rest position, illustrated in FIG. 3, in which the flap 12 allows free outflow of the exhaust gases along the exhaust gas main line 4, which does not cause them to flow through the heat exchanger 2, and a first work position, illustrated in FIG. 4, in which the flap 12 obstructs the passage of the exhaust gases, forcing them to pass through the U-shaped path 5 of the heat exchanger. Such first work position defines an operating condition for total heat recovery, as it shall be clear from the description that follows.

To the rest position of the flap 12, there is associated a normal operating condition, in which the temperature of the cooling water flowing out from the engine 14 is at an optimal value, generally comprised in the range between 80° C.-90° C. approximately. In such condition, the cooling water usually circulates through the radiator 17 and through the heat exchanger of the EGR 21, and it also passes through the heat exchange unit 8 without the occurrence of any heat exchange except for the normal losses of thermal energy within the exchanger 2.

Vice versa, if the temperature of the cooling water flowing out from the engine 14 is lower than the optimal value (for example following a cold start or under particularly cold climatic conditions) it controls the switching of the position of the flap 12 to the operating condition of FIG. 4, in which the exhaust gases collected in the manifold 15—after passing through the unit for treating the exhaust gases 16—reach the exhaust gas main line 4 without passing directly therethrough due to the presence of the flap 12.

As a matter of fact, the flap 12 (FIG. 4) substantially forces the exhaust gases onto a transverse path with respect to the flow direction usually imposed by the geometry of the exhaust gas main line 4. In other words, indicated with X (FIGS. 1, 3, 4, 6) the flow direction of the exhaust gases inside the exhaust gas main line 4 in the normal operating condition illustrated in FIG. 3, the flap 12 diverts the exhaust gases towards the inlet section 6 of the exchanger 2 imparting a motion thereto in the transverse direction with respect to the flow direction of the exhaust gases inside the gas main line 4. In particular, the flap 12 causes a motion of the exhaust gases away in the transverse direction at the inlet section 6 when the latter is passed through by the abovementioned exhaust gases.

It should be observed that the motion of the exhaust gases in the transverse direction with respect to direction X is determined by the transverse orientation of the heat exchanger 2 with respect to the exhaust gas main line 4, hence the diversion imparted by the flap 12 is strictly related to the geometry and to the arrangement of the exchanger 2 with respect to the exhaust gas main line 4.

The exhaust gases pass through the path 5 transferring heat to the cooling water of the engine 14 which flows in the heat exchange unit 8. Then, the exhaust gases, diverted in the path 5, gain an approaching motion in the transverse direction towards the exhaust gas main line 4, passing through the outlet section 7 before being subjected to a further diversion which returns the motion thereof along direction X.

The heat exchange between the exhaust gases that pass through the path 5 and the cooling water which passes through the heat exchange unit 8 considerably reduces the times required to reach the steady thermal conditions of the engine 14, in particular it reduces the times required to reach the optimal temperature of the cooling water.

It should also be observed that, referring to FIG. 2, the cooling water heated by the exchanger 2 first passes through the cabin heater 29 and only subsequently returns to the inlet of the pump 20 and thus to the engine 14. The choice is supported by the fact that it is preferable to privilege the comfort of the occupants of the cabin, to be attained by means of a quick heating of the cabin if required by the driver, with respect to having extremely lower heating times for the cooling water of the engine (a condition obtainable by directing the water flowing out from the exchanger 2 directly into the inlet of the pump 20 and to the engine 14) at a price of poor comfort inside the cabin.

The reduction of the times required to reach the steady thermal condition of the engine creates advantages in terms of fuel consumption in that, by attaining the ideal operating temperature within a shorter time, the frictions caused by the high viscosity of oil and the formation of some pollutant species, higher when operating under cold conditions, are considerably reduced.

Furthermore, it should be observed that, by routing the exhaust gases onto a transverse path with respect to the normal flow direction inside the exhaust gas main line 4, it is possible to overcome the encumbrance drawbacks of the prior art solutions described previously.

In fact, the heat exchanger 2 is essentially developed in the transverse direction with respect to the exhaust gas main line 4, hence allowing arranging the unit 1, inside an engine bonnet, at a very close position with respect to the catalyst, in particular it allows positioning thereof before the flame damper wall, hence at a zone in which the temperatures of the exhaust gases are still at a considerable value.

Furthermore, it should be observed that the unit 1 according to the invention is particularly advantageous if compared to the arrangement of the components of the engine compartment of a modern car, in which, due to requirements related to the reduction of pollutant emissions, the unit for treating the exhaust gases 16 has acquired a position as close as possible to the cylinder head of the engine 14 (the so-called "close coupled" position).

Given that the arrangement of a recovery unit immediately on the exhaust manifold 15 and upstream of the treatment unit 16 is not advisable for reasons related to the operating temperature of the unit 16 (taking away part of the heat from the exhaust gases inside the unit 1, the latter would flow into the unit 16 at a temperature too low to obtain high efficiency), and it is clear that the only solution for arranging the unit 1 is by positioning it downstream of the unit 16.

Considering the little space available for example on category A or B vehicles, the unit 1 according to the present invention represents the only viable solution due to its small longitudinal overall dimensions.

Advantageously, referring to FIG. 5, it is possible to use a recovery unit 1 according to the present invention in combination with the engine 14 even under ways of connection and management of fluids which are different with respect to what has been illustrated in FIG. 2.

Referring to FIG. 5, in which the components identical to FIG. 2 are indicated with the same reference number, arranged inside the engine compartment 13 is the engine 14 mechanically connected to which (or independently driven by an electric motor) is a pump 33 having a delivery connected by means of a conduit 34 to the orifice 9 of the unit 1. The orifice 10 is instead fluid dynamically connected, by means of a conduit 35, to the inlet of an expander 36, in turn mechanically connected to an electrical power generator 37.

A conduit 38 fluid dynamically connects the outlet of the expander 36 to a condenser 39, which is fluid dynamically connected, by means of a conduit 40, to the inlet of the pump 33.

The system illustrated in FIG. 5 operates as follows.

A man skilled in the art will observe that the connection between the pump 33, the unit 1, the expander 36 and the condenser 39 is functionally identical to the connection between—respectively—pump, recovery steam generator, expander and condenser in a steam plant operating according to a Rankine thermodynamic cycle.

The pump 33, the heat exchange unit 8, the expander 36 and the condenser 39 fluid dynamically connected to each other by means of the conduits 34, 35, 38, 40 as previously described define a circuit closed and isolated with respect to the internal combustion engine 14, particularly with respect to the cooling circuit thereof.

Such closed circuit is passed through by a working fluid different from the cooling water of the engine 14.

The pump 33 conveys a flow of working fluid in the conduit 34 towards the heat exchange unit 8. Inside the exchanger 2, the working fluid which passes inside the heat exchange unit 8 receives a heat flow from the exhaust gases which possibly pass inside the path 5 and flow out through the outlet orifice 10 in vapour phase.

From here, it is conveyed to the inlet of the expander 36 by means of the conduit 35, in such a manner that the expander 36 generates mechanical work by putting the generator 37 in rotation. The fluid discharged by the expander 36 is collected in the conduit 38 and it is conveyed to a condenser 39, which lowers the temperature thereof and causes a double change of phase thereof from heated vapour to moist vapour and from moist vapour to liquid. Then, the working fluid flows into the conduit 40 and returns to the inlet of the pump 33, then it once again passes through the cycle described previously.

The position of the flap 12 is controlled by the actuator 12A whose operation is regulated by an electronic control unit (not illustrated) and it is modulated depending on the operating conditions of the engine, the power required from the generator 37 and the temperature and pressure of the working fluid at the inlet of the expander 36 and at the outlet of the condenser 39 (i.e. in conduit 35 and in conduit 40).

The position of the flap 12 is modulated between the positions illustrated in FIGS. 3, 4 and at least one intermediate working position of the type illustrated in FIG. 6.

Referring to FIG. 6, the flap 12 is rotated, with respect to the resting position illustrated in FIG. 3, by an angle exceeding 90°, in such a manner that the exhaust gases that enter the exhaust gas main line 4 are distributed, depending on the fluid dynamic conditions of the system, partly in the path 5 and partly in the interface 3 and in the exhaust gas main line 4. In this way it is defined a partial heat recovery operating condition.

In this way it is possible to regulate the flow rate of the exhaust gases which pass through the path 5, allowing for example to reduce possible unwanted back pressures on the engine corresponding to high loads of the engine itself and regulating the thermal power transferred to the working fluid which goes through the Rankine cycle, regulating the fluid dynamic conditions at the inlet of the expander. It should also be observed that, in a manner similar to what usually occurs in the Rankine cycle plant, it is important to monitor the temperature and the pressure of the working fluid at the inlet of the expander in order to prevent exceeding the limits of the component.

It is thus possible to exploit the mechanical power generated by the expander, or, in case it is coupled to an electric generator 37 the electric power, in order to increase the overall energy efficiency of the vehicle. A further advantageous embodiment of a recovery unit according to the present invention is illustrated in FIG. 7. The components identical to those previously described are indicated using the same reference number.

Illustrated in FIG. 7 is a recovery unit 1' comprising a heat exchanger 2' having a substantially U-shaped path 5'. The path 5' is in fluid dynamic communication with the interface 3 and the exhaust gas main line 4 through an inlet section 6' and an outlet section 7'. Similarly to the unit 1, installed in the interface 3 is the flap 12 articulated with respect to the axis 11. The heat exchanger 2' is not provided with the heat exchange unit 8 and with the inlet and outlet orifices 9, 10. This, as described hereinafter, is due to the particular method of installation of the unit 1' with respect to that of the engine of the vehicle on which it is installed. In particular, the unit 1' is mounted on the exhaust gas main line 4 downstream of the unit for treating the exhaust gases 16 and it is immersed in an oil sump 41 of the engine 14 (non illustrated), in such a manner to come into contact with the oil present therein.

The system described above and illustrated in FIG. 7 operates as follows.

The position of the flap 12 is controlled by the actuator 12A, whose operation is regulated by an electronic control unit (not illustrated), between any of the positions illustrated in FIGS. 3, 4, 6 in order to regulate the flow rate of the exhaust gases that pass through the path 5'.

In particular, the position of the flap is controlled according to the temperature indication—provided by a per se known sensor—of the oil in the sump 41.

This allows regulating the heat flow that passes from the exhaust gases to the oil contained in the sump, hence allowing, in case of cold start, to reduce the time required to achieve the ideal temperature of the oil within the sump 41 and circulating in the engine 14.

The quick heating of the engine oil 14 allows, as already described, to considerably reduce fuel consumptions during the cold start step, given that the viscosity thereof is reduced as the temperature increases. Note in such case the particular advantage offered by the use of the unit 1' according to the present invention. In fact, the essentially transverse development thereof—with respect to the geometry of the exhaust gas main line 4 and to the flow direction of the exhaust gases passing through the gas main line 4 itself—allows submerging the sole exchanger 2' into the oil sump 41, without the need of passing the exhaust gas main line 4 through the oil sump. The latter condition, as it is evident, would be substantially unavoidable in the case of a prior art solution with the exchanger arranged in series to the exhaust gas main line 4 and aligned to the flow direction of the exhaust gases flowing thereinto.

Such solution, alongside entailing safety problems regarding the occupants of the vehicle, would be entirely useless and harmful for the engine 14. As a matter of fact, having an exhaust pipe submerged in a sump 41 implies the impossibility of eliminating the heat exchange between the exhaust gases of the oil contained in the sump with the ensuing danger of overheating the oil and boiling of the same.

By submerging the sole exchanger 2', as in the case of the unit 1', it is possible to modulate the amount of the heat exchange between the exhaust gases and the oil contained in the sump 41 by simply operating on the position of the flap, and interrupting the abovementioned heat exchange by simply rotating the flap 12 towards the resting position illustrated in FIG. 3.

Further advantageous applications of the units 1, 1' are illustrated in FIGS. 8 to 13.

Figure 8:
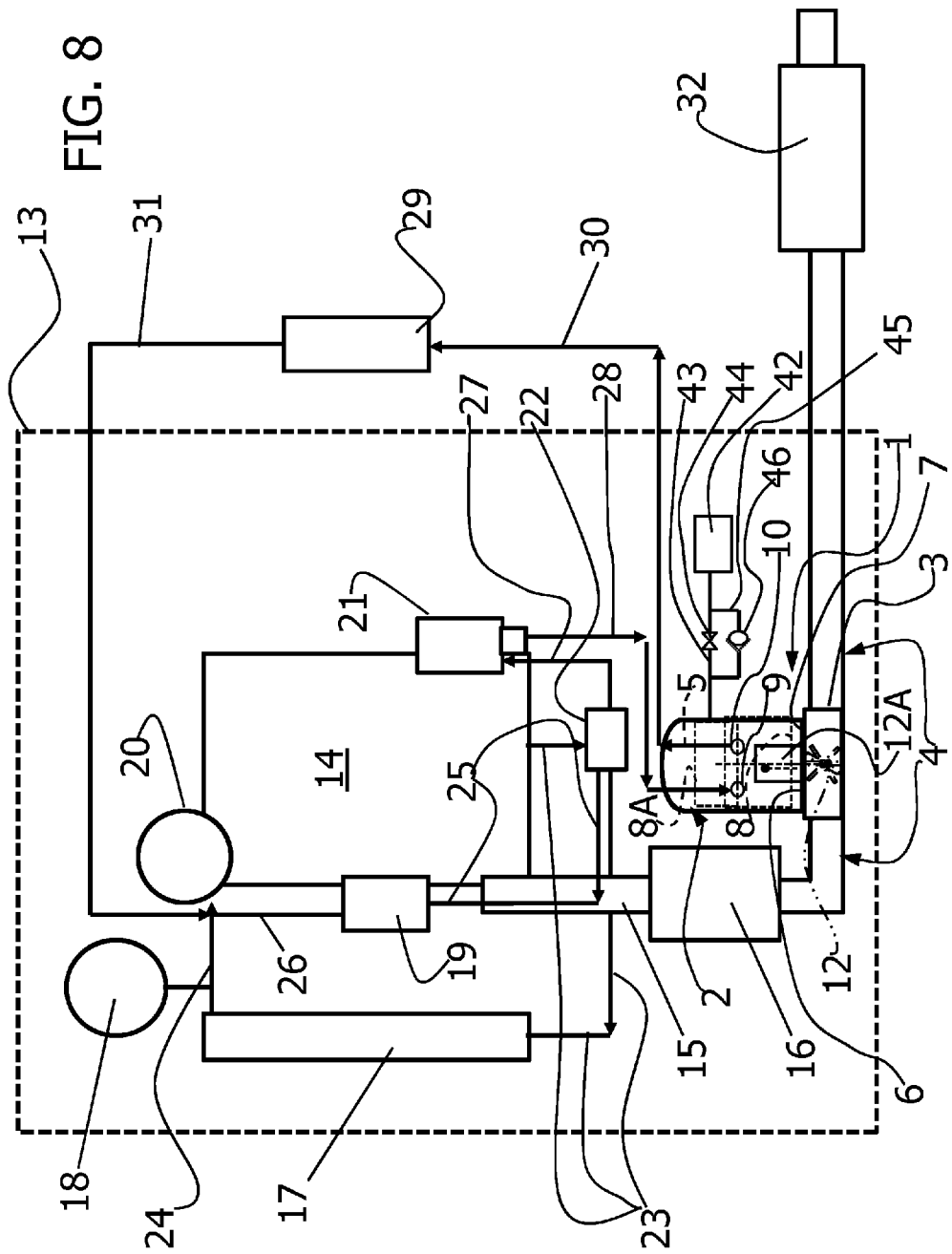

Referring to FIG. 8, in which the components described previously have the same reference number, the unit 1 is inserted into the engine unit 13 and comprises a metal hydrides storage bed 42 connected by means of a first channel 43 to a second heat exchange unit 8A arranged to exchange thermal energy with the unit 8. Unit 8 and unit 8A are environments isolated with respect to each other and unit 8 is an environment also isolated with respect to the path 5.

A two-position valve 44 is arranged in series on the channel 43, while a second channel 45 arranged on which is a unidirectional valve 46 is positioned branching with respect to the channel 43. The unidirectional valve 46 is arranged to allow a flow solely towards the direction of the bed 42.

The bed 42 is capable of storing and releasing hydrogen depending on the operating conditions of the thermo-fluid dynamic system with which it interacts. In particular, under conditions of cold start the engine 14, the bed 42 and the exchanger 2 may be exploited sequentially for heating the cooling water.

Figure 9:
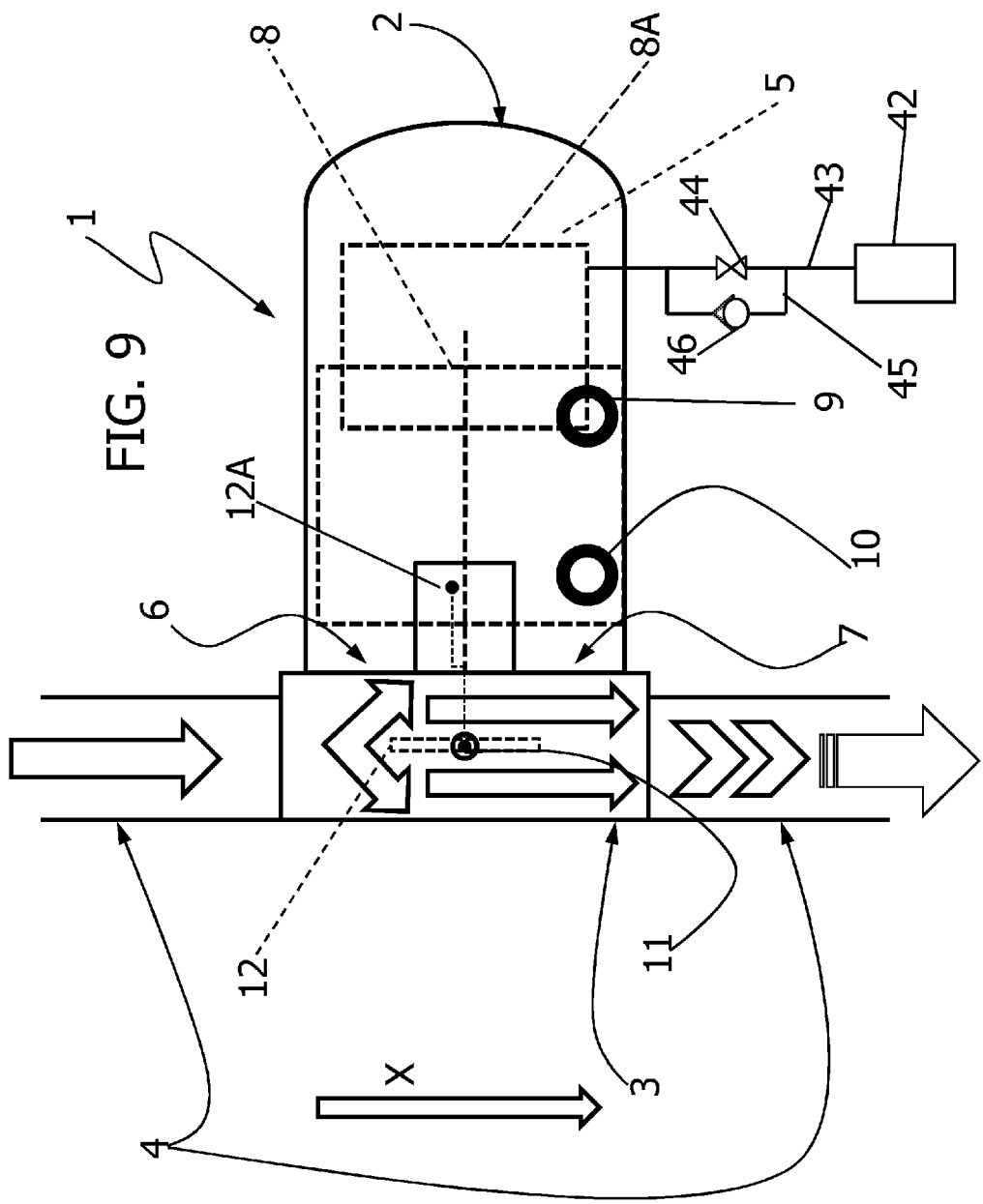

Referring to FIG. 9, during the first moments following the start-up, the flap 12 is maintained in resting position, thus excluding the circulation of exhaust gases in the path 5, while the valve 44 is switched to open position, i.e. such to allow a flow of hydrogen in the channel 43 (the flow in the channel 45 is prevented by the unidirectional valve 46).

Such hydrogen flow enters into the unit 8A and heats, due to the release of formation heat of the metal hydrides, the cooling water that flows in the heat exchange unit 8.

Figure 10:
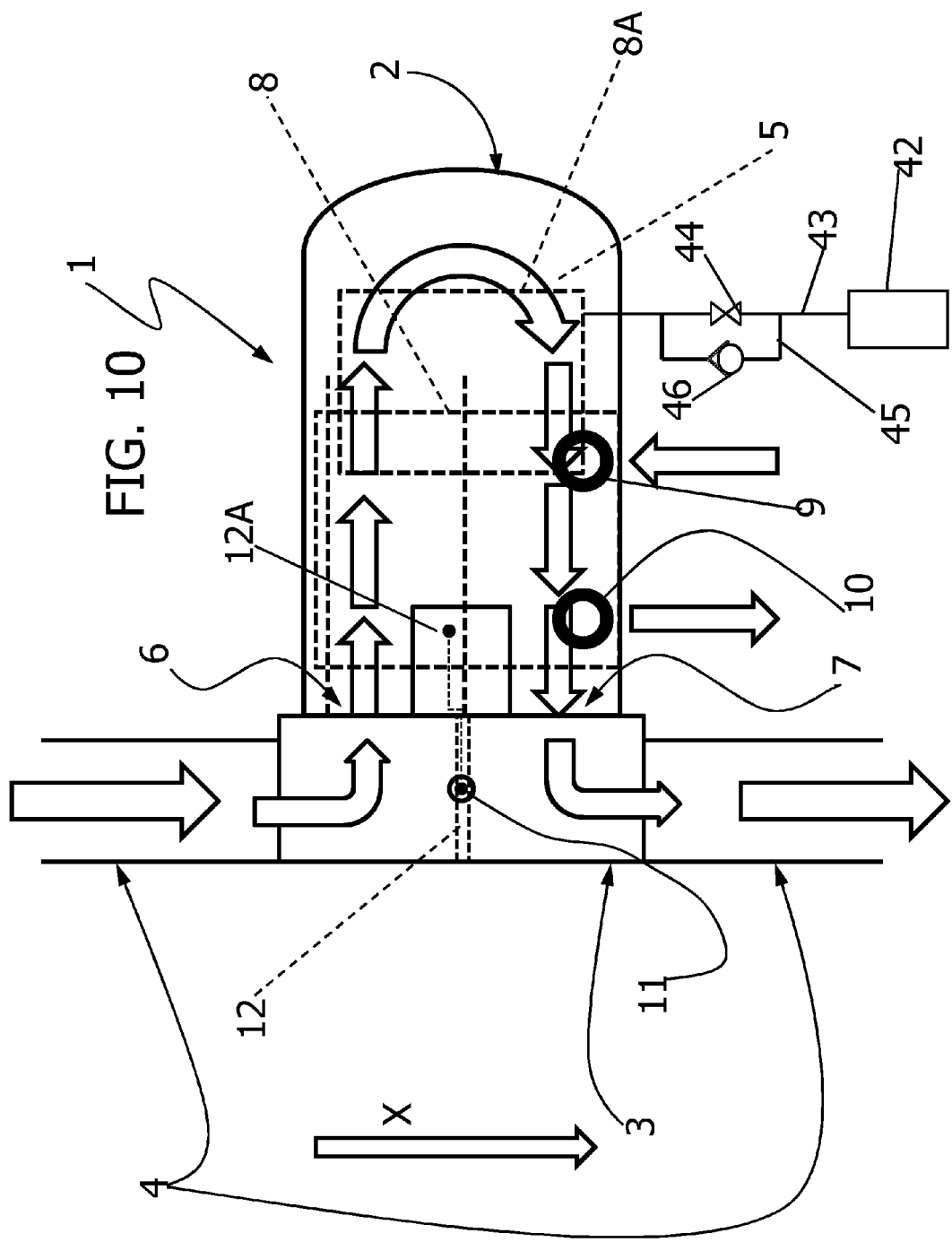

Referring to FIG. 10, upon completing the release of hydrogen by the bed 42, the position of the flap 12 is switched to the first working position and the entire flow of the exhaust gases is diverted to the path 5. Simultaneously, the valve 44 is switched to the closed position and occludes the flow through the channel 43.

This allows heat exchange between the gas inside the path 5 and the cooling water of the engine 14 through methods similar to those previously described. Furthermore, an amount of heat is exchanged between the gases inside the path 5 and the unit 8A, thus causing a hydrogen release towards the bed 42, possible solely due to the unidirectional valve 46 through the channel 45. This allows restoring the hydrogen reserve of the bed 42 making it available for the subsequent cold start of the engine 14.

Figure 11:
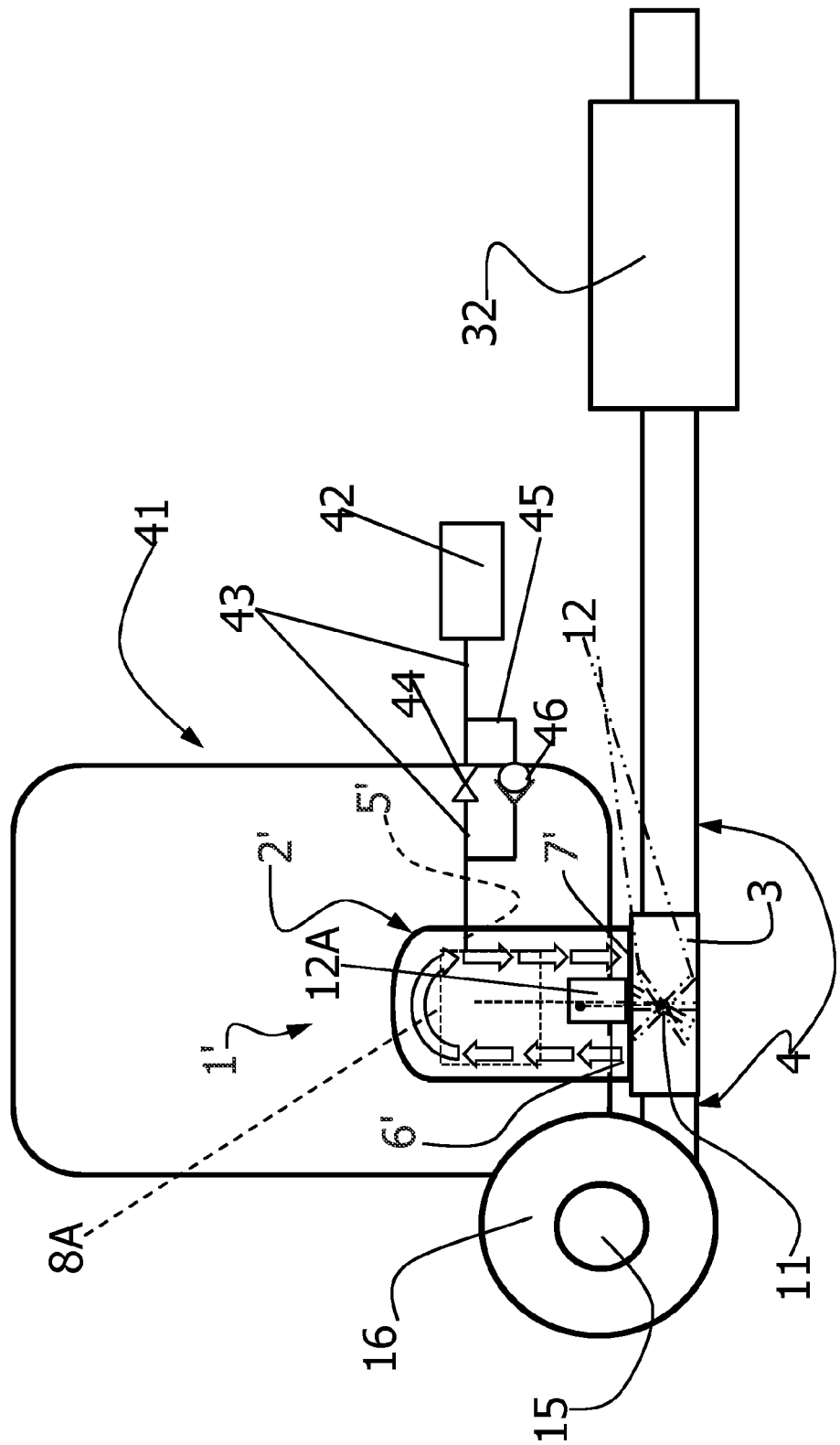

An identical operating principle is exploited in the application illustrated in FIG. 11. The unit 1' comprises the exchanger 2' submerged in the oil sump 41 and inserted into the engine unit 13 and comprises the metal hydrides storage bed 42, the heat exchange unit 8A, the two-position valve 44 arranged in series on the channel 43, and the unidirectional valve 46 connected together by means of the channels 43, 45 as previously described. It should be observed that the heat exchange unit 8 is not provided, hence the heat exchange occurs solely between the hydrogen flow released by the bed 42 and the gases that pass through the path 5 of the exchanger 2.

The methods of operation of the system are identical to those of the application of FIG. 1, with the sole differences lying in the absence of the unit 8 and in the fact that the fluid that benefits from the thermal energy released by the hydrogen flow is the oil contained in the sump 41 instead of the cooling water of the engine 14.

Figure 12:
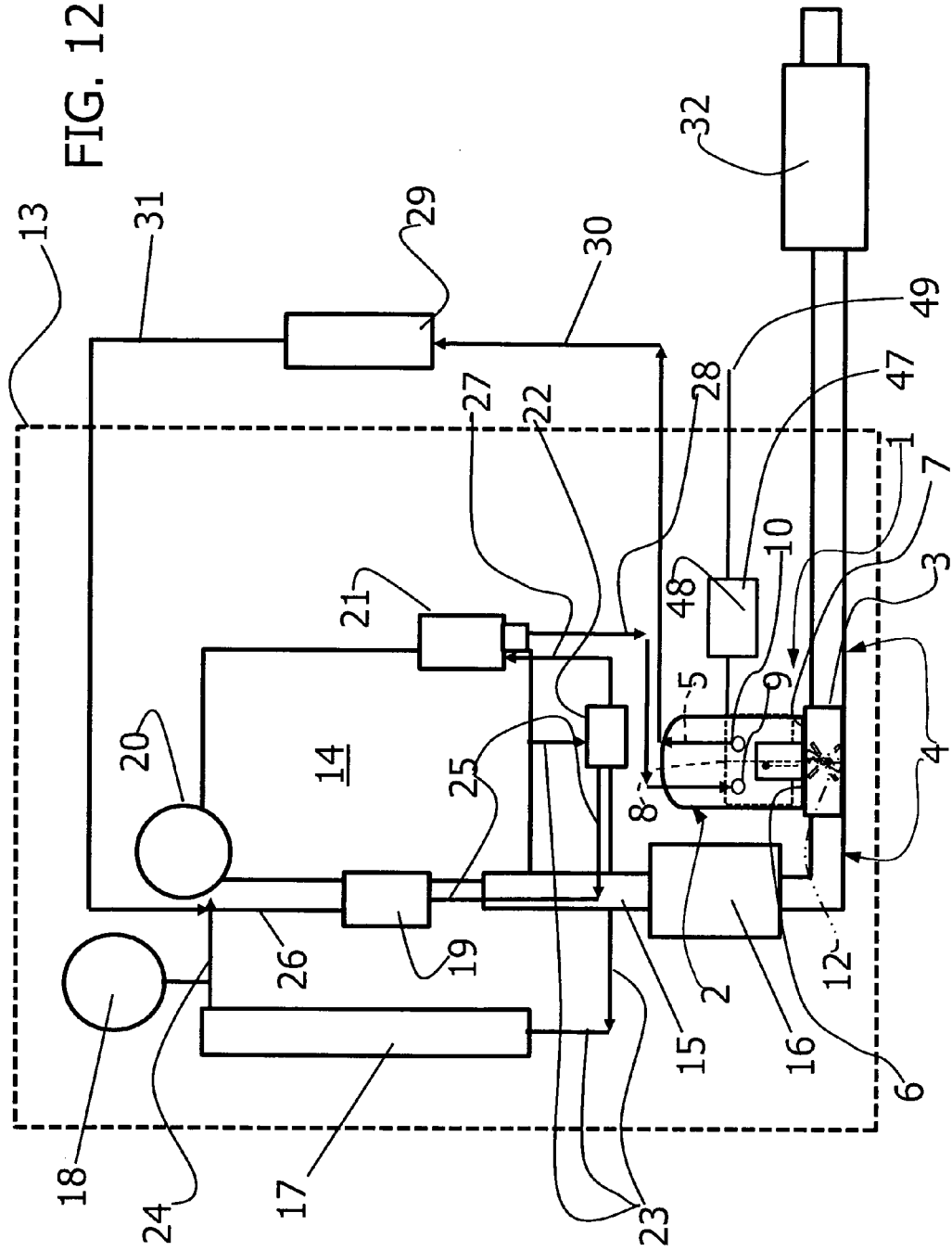

Referring to FIG. 12, in which the previously described components have the same reference number, the unit 1 is inserted into the engine unit 13 and comprises a DC/DC converter 47 connected by means of an electric line 48 to the exchanger 2. In particular, the electric line 48 is connected to one or more layers of thermoelectric material arranged in the exchanger 2, in particular, to the interface between the unit 8 and the path 5. The DC/DC converter 47 is arranged for the connection to the power supply of the vehicle on which the engine 14 is installed by means of an electric line 49.

The layers of thermoelectric material are used for producing electrical power to be made available to the vehicle and for such purpose, the temperature difference established therein due to the positioning between the conduit 5 (hotter) and the unit 8 (colder), is exploited to generate an electric voltage and an electric current towards the converter 47 along the electric line 48. The converter 47 processes the current that reaches it through the line 48 and makes it available to the vehicle by means of the line 49.

Analogous is the operation of the system illustrated in FIG. 13, analogous to the system of FIG. 7 and comprising the unit 1' having one or more layers of thermoelectric material arranged on the interface between the exchanger 2 and the oil in the sump 41.

Obviously, the manufacturing details and the embodiments may widely vary with respect to what has been described and illustrated strictly for exemplifying purposes, without departing from the scope of protection of the present invention, as defined by the claims.

For example, provided for may be a flap 12 rotating around an axis arranged not at a position substantially central with respect to the exhaust gas main line 4, but a at a position substantially close to the exchanger 2, as shown in FIG. 14. The flap 12 would in such manner have a quadrangular shape, same case applying to the section of the gas main line 4 at the interface 3, and at the resting position thereof (illustrated with a dashed line, while the working positions are illustrated using a dashed-double-dot line) entirely occludes the inlet section of the path 5.

The invention claimed is:
1. A unit for recovering and converting thermal energy from the exhaust gases of an internal combustion engine of a vehicle, said unit comprising:
   a heat exchanger to be traversed by exhaust gases flowing along a by-pass path branching out from an exhaust gas main line of said internal combustion engine, and
   valve means for controlling the flow of the exhaust gases through said path, said valve means being driven by an actuator device, wherein
   said by-pass path is a U-shaped path defined entirely by said heat exchanger, starting from an inlet section of said heat exchanger and ending at an outlet section of said heat exchanger, said inlet and outlet sections being located on a same side of the heat exchanger and both opening on an interface conduit portion interposed in said exhaust gas main line,
   said heat exchanger is arranged so that said U-shaped path is oriented transversely to the direction of the exhaust gas main line, in such a manner that the exhaust gases traversing the heat exchanger flow firstly in the transverse direction away from the exhaust gas main line and then back in the transverse direction towards the exhaust gas main line, said valve means being arranged within said interface conduit portion, at a position axially intermediate between merging points of said inlet and outlet portions of the heat exchanger.

2. The unit according to claim 1, wherein said valve means comprise a flap articulated around an axis.

3. The unit according to claim 2, wherein said flap is movable between a rest position in which said flap is arranged so as to allow free flow of the exhaust gases in said exhaust gas main line and a first work position in which said flap obstructs the passage of the exhaust gases through said exhaust gas main line forcing said exhaust gases to pass through said heat exchanger.

4. The unit according to claim 3, wherein said flap has at least one intermediate work position.

5. The unit, according to claim 1, wherein said heat exchanger further comprises a heat exchange unit having an inlet orifice and an outlet orifice, said heat exchange unit being arranged to promote heat exchange between a fluid circulating therein and a fluid circulating in said path.

6. The unit according to claim 5, wherein the unit is arranged to cooperate with an engine unit of a motor vehicle comprising said internal combustion engine, in which the inlet orifice of said heat exchange unit is connected to a heat exchanger for EGR operatively connected to said internal combustion engine and said outlet orifice is connected to a cabin heater.

7. The unit according to claim 6, wherein the fluid circulating inside said heat exchange unit is cooling water of said internal combustion engine.

8. The unit according to claim 5, wherein the unit is arranged to cooperate with an engine unit comprising said internal combustion engine and comprising a pump, an expander, an electrical power generator mechanically connected to said expander and a condenser connected to the outlet of said expander and to said pump, in which the inlet orifice of said heat exchange unit is connected to said pump and the outlet orifice of said heat exchange unit is connected to the inlet of said expander.

9. The unit according to claim 8, wherein said pump, heat exchange unit, expander, condenser are fluid dynamically connected defining a circuit closed and isolated with respect to said internal combustion engine.

10. The unit according to claim 1, wherein said heat exchanger is mounted submerged in an oil sump of said internal combustion engine.

11. The unit according to claim 1, wherein the unite is arranged to cooperate with a metal hydrides storage bed suitable to release or store hydrogen and connected to said heat exchanger through a first and a second channel, in which said first channel comprises a two-position valve arranged thereon in series and said second channel is connected branching with respect to said first channel and comprises a unidirectional valve arranged therein.

12. The unit according to claim 1, wherein said heat exchanger comprises one or more layers of thermoelectric material connected by means of an electric line to a DC/DC converter, said DC/DC converter being arranged for the connection to a power supply of a vehicle on which said internal combustion engine is installed.

13. The unit according to claim 1, wherein said heat exchanger is positioned downstream of a unit for treating the exhaust gases connected to said internal combustion engine.

* * * * *